(12) United States Patent
Schuck, II

(10) Patent No.: US 7,699,406 B1
(45) Date of Patent: Apr. 20, 2010

(54) TOWED VEHICLE BRAKE ACTUATOR ASSEMBLY

(75) Inventor: Peter Fredrick Schuck, II, Evansville, IN (US)

(73) Assignee: Peter Frederick Schuck, II, Newburgh, IN (US)

( * ) Notice: Subject to any disclaimer, the term of this patent is extended or adjusted under 35 U.S.C. 154(b) by 832 days.

(21) Appl. No.: 11/598,249

(22) Filed: Nov. 9, 2006

Related U.S. Application Data

(60) Provisional application No. 60/736,403, filed on Nov. 12, 2005.

(51) Int. Cl.
*B60T 13/00* (2006.01)
(52) U.S. Cl. ........................ 303/7; 188/112 R
(58) Field of Classification Search ............ 303/12, 303/4, 7, 31, 127; 188/34, 112 R, 357, 356
See application file for complete search history.

(56) References Cited

U.S. PATENT DOCUMENTS

| 3,824,792 | A | * | 7/1974 | Grabb et al. | .................. 60/411 |
| 4,398,771 | A | * | 8/1983 | McCurry et al. | .............. 303/15 |
| 5,431,253 | A | * | 7/1995 | Hargrove | .................... 188/3 H |
| 5,503,468 | A | * | 4/1996 | Saffran | ......................... 303/7 |
| 5,915,798 | A | * | 6/1999 | Ford | ............................... 303/7 |
| 6,158,823 | A | * | 12/2000 | Schuck | .......................... 303/7 |
| 6,557,948 | B2 | * | 5/2003 | Greaves | ......................... 303/7 |

* cited by examiner

*Primary Examiner*—Xuan Lan Nguyen

(57) ABSTRACT

A system for actuating brakes in a towed vehicle in response to actuation of brakes in a towing vehicle comprising a cylinder including an inner cylindrical wall attached to a brake pedal in the towed vehicle and an outer cylindrical wall attached to the firewall in the towed vehicle. An air line supplies positive airflow from the towing vehicle to the cylinder and to a venturi to create a vacuum in response to the airflow. The vacuum is supplied to a brake booster in the towed vehicle while the airflow is supplied to the air cylinder to move the brake pedal in the towed vehicle in proportion to the amount of braking is the towing vehicle.

16 Claims, 4 Drawing Sheets

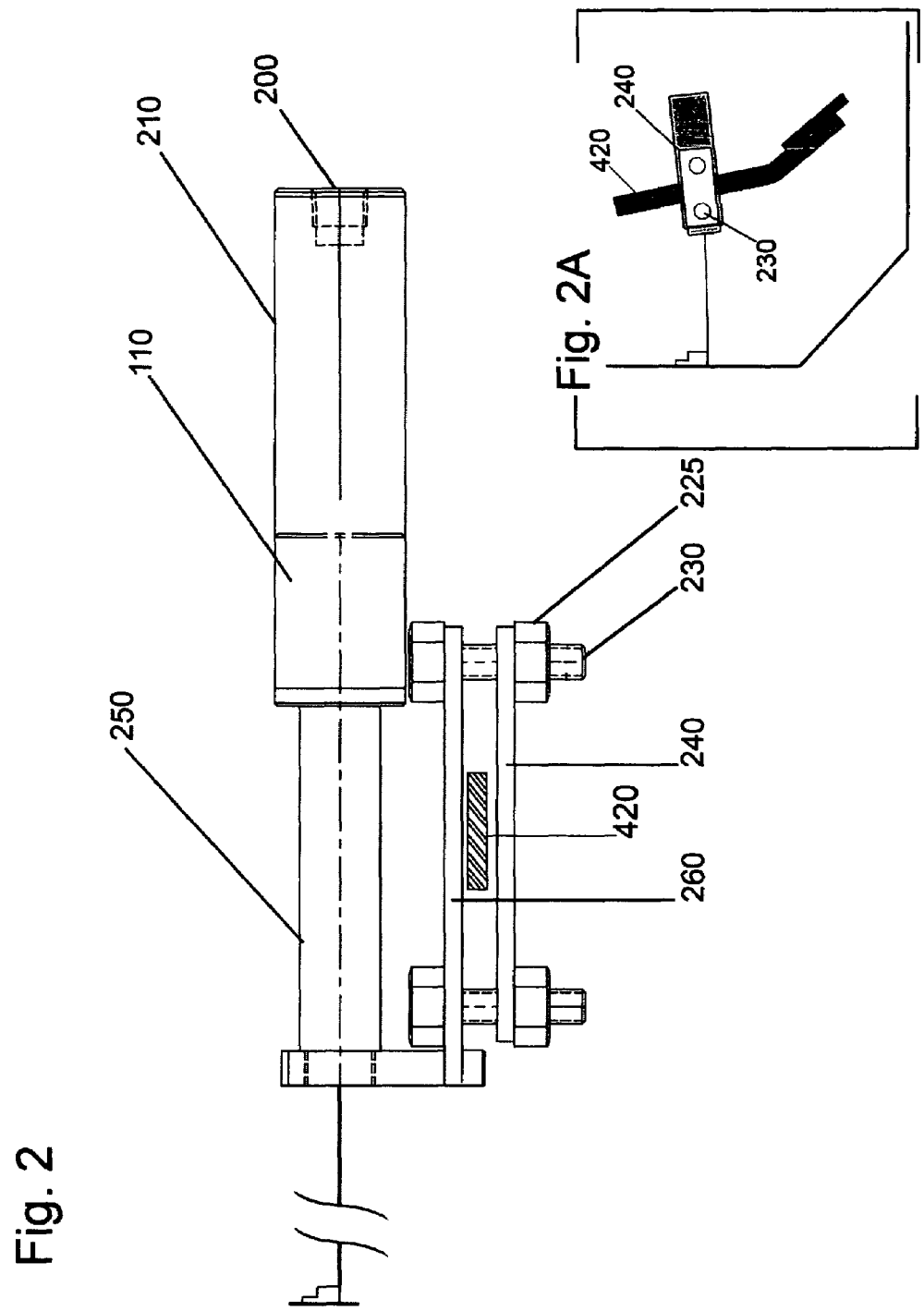

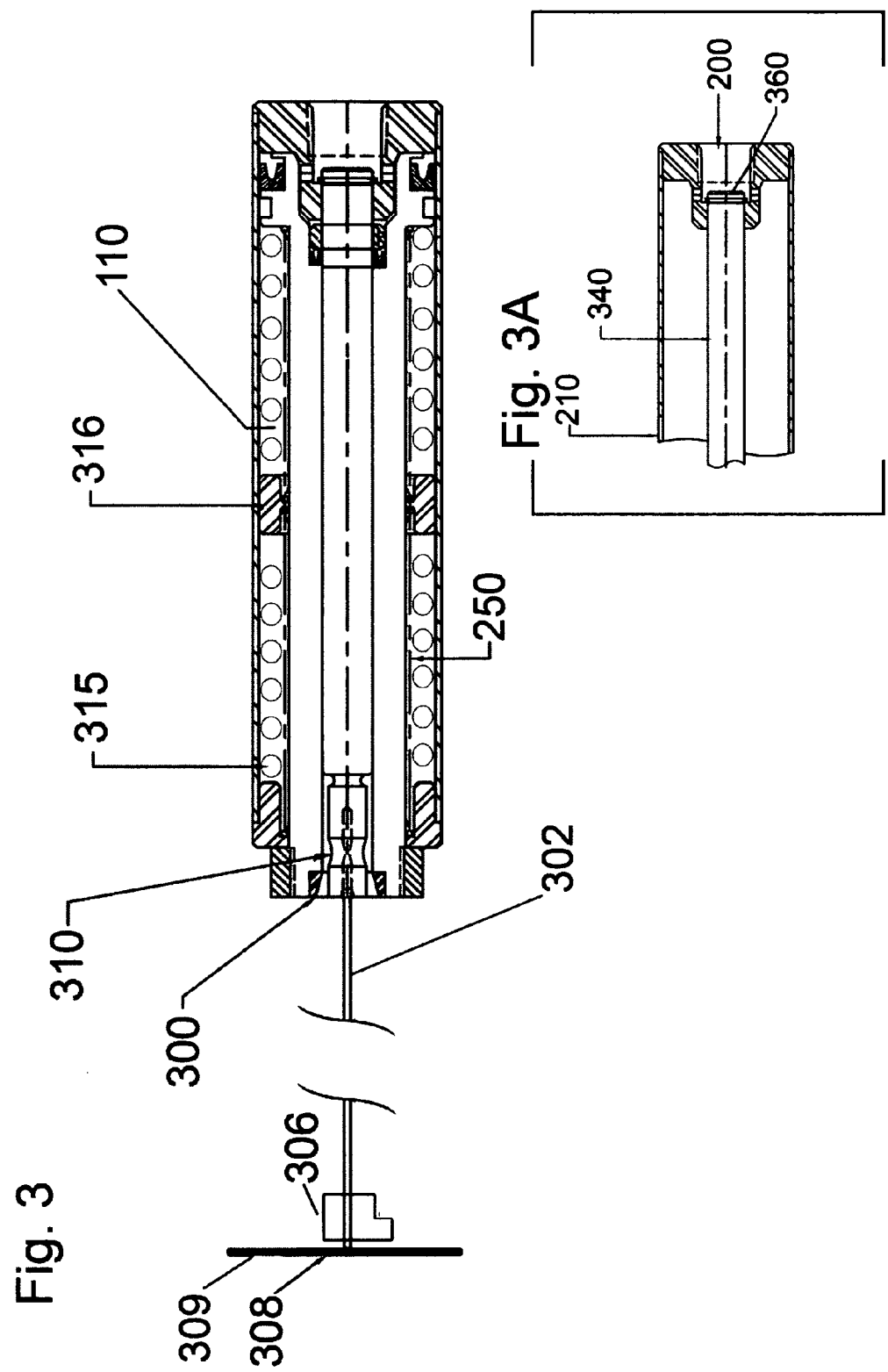

TOWED VEHICLE BRAKE ACTUATOR ASSEMBLY

CROSS REFERENCES TO RELATED APPLICATIONS

Provisional Application for Patent No. 60/736,403, filed Nov. 12, 2005, with the title, "Towed Vehicle Brake System" which is hereby incorporated by reference. Applicant claims priority pursuant to 35 U.S.C. Par. 119(e)(i).

STATEMENT AS TO RIGHTS TO INVENTIONS MADE UNDER FEDERALLY SPONSORED RESEARCH AND DEVELOPMENT

Not applicable

BACKGROUND OF THE INVENTION

1. Field of the Invention

This invention relates to towed vehicle brake actuator assemblies.

2. Background Information

Applicant is co-inventor of Schuck et al, "Towed Vehicle Brake Actuator Assembly" Ser. No. 11/096,083 filed Mar. 31, 2005.

Existing towed vehicle brake actuating systems lack a means of applying proportionate braking effort to a towed vehicle using air pressure.

A mechanical vacuum pump is used to create a vacuum in the towed vehicle's power brake system.

As will be seen in the subsequent description of the preferred embodiments of the present invention, the present invention overcomes shortcomings of prior art.

SUMMARY OF THE INVENTION

The present invention in the preferred embodiment comprises a venturi that generates vacuum from a towing vehicle's compressed air brake system, an air valve in communication with a vacuum sensor that controls the level of vacuum generated by the venturi, an air cylinder that applies a towed vehicle's brakes, and a bracket for attaching the air cylinder to a brake pedal arm. The vacuum is supplied to the towed vehicle brake booster making the power brakes of the towed vehicle operate as if the engine were running.

The air cylinder comprises an inner wall that serves as a stationary mandrel, an outer wall that serves as the cylinder body, at least one return spring between the inner and outer walls, a DELRIN washer used as a separator if more than one return spring is used, a pull rod attached to the outer wall, and a cable attached to the pull rod.

The cylinder inner wall is attached to the bracket, which is attached to the brake pedal arm in the towed vehicle. As the towing vehicle brakes are applied, compressed air from the towing vehicle air brake system enters into the air cylinder which forces the outer wall of the cylinder away from the inner wall. The pull rod, being attached to the outer wall, with a cable attached to the pull rod and to the towed vehicle's firewall, as the outer wall, which is free to be displaced, is displaced with respect to the inner wall by compressed air pressure, the compressed air forces the outer wall of the cylinder away from the brake pedal. The inner wall is attached to the brake pedal by means of the bracket, so, as the outer wall is forced away from the brake pedal, the pull rod cable, which is in mechanical communication with the outer wall, pulls on the towed vehicle's firewall, forcing the brake pedal, which is in mechanical communication with the brake pedal, towards the firewall, applying the towed vehicle's brakes.

As the air input is from the towing vehicle's compressed air brake system, the present invention will apply truly proportionate braking in the towed vehicle.

Air from the towed vehicle's air system is directed, in parallel, to both the cylinder and the venturi. The vacuum created by the venturi is routed to the towed vehicle's vacuum booster of the power brake system of the towed vehicle's brake system creating vacuum assisted brakes without the means of a mechanical vacuum pump.

BRIEF DESCRIPTION OF THE DRAWINGS

FIGS. 2 and 2A are views of the cylinder and mounting bracket.

FIGS. 3 and 3A are cross section views of the cylinder.

DESCRIPTION OF THE PREFERRED EMBODIMENTS

Figure 1:
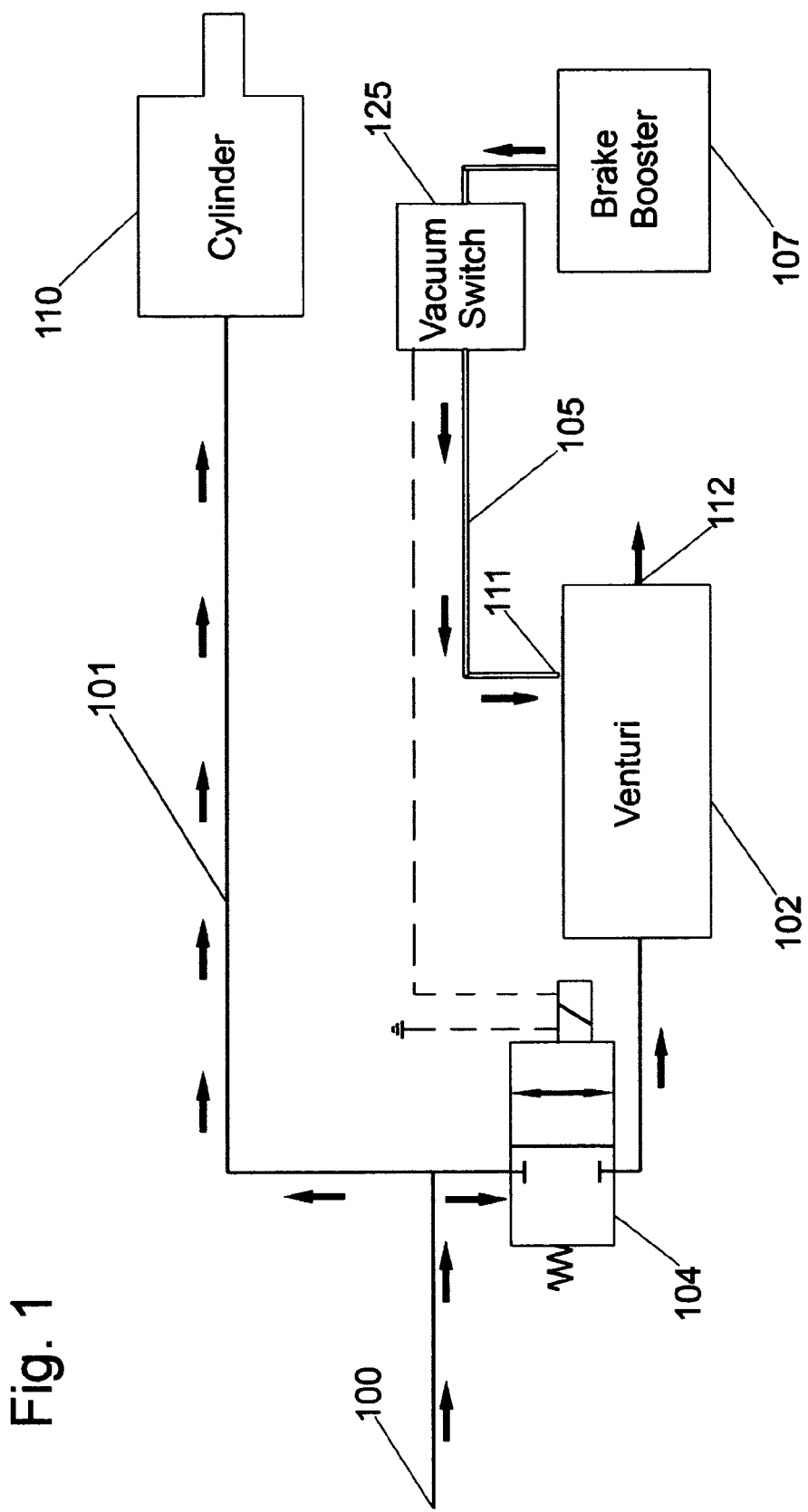
FIG. 1 is a schematic of the preferred embodiment of the present invention, a towed vehicle brake system

Referring to FIG. 1, the preferred embodiment of the present invention, a towed vehicle brake actuator assembly 10, comprises an air input 100, a venturi 102, such as is obtainable from PIAB, which is known to the trade, a vacuum line 105 which is attached to a vacuum brake booster 107 located in a towed vehicle (not shown), a vacuum sensor such as vacuum switch 125, an air valve 104, and a cylinder 110.

Air input 100, from a towing vehicle (not shown), is applied to the venturi 102 as well as to an actuator such as the cylinder 110, the venturi 102 and the cylinder 110 being in parallel. As the air passes through the venturi 102, a vacuum is created in the vacuum line 105 and the vacuum brake booster 107. Vacuum is communicated through the vacuum line 105 through the vacuum switch 125 that senses the vacuum level in the vacuum brake booster 107. A brake booster 107 in a vehicle often uses a vacuum booster to enhance the activation of hydraulic brakes in the vehicle for example. Vacuum for the booster is typically supplied by the motor of the vehicle but when the vehicle is being towed normally the engine would not be operating. The air valve 104 opens as more vacuum is required for the vacuum brake booster 107, which allows input air 100 to pass through the valve 104 to the venturi 102. As air enters venturi 102, a vacuum is created in the line 105 from a vacuum port 111 in the venturi 102 which results in vacuum in the power brake booster 107. Excess air is vented through an exhaust port 112 of the venturi 102. Vacuum switch 125 is in electrical communication with the air valve 104 through an electrical connection 130. Vacuum switch 125 is powered by a 12 volt power source 135, in the preferred embodiment of the present invention.

The venturi 102 serves the purpose of creating vacuum without the use of a mechanical vacuum pump.

This is a simpler more effective way to actuate a brake pedal than prior art. The towed vehicle brakes are applied in proportion to input air from the towing vehicle. The input air is typically, but not limited to, the air used in a towing vehicle's brake system as in the case with a diesel powered towing vehicle with air brakes. No standard air cylinders were available. No systems marketed today incorporate a venturi to create vacuum. The applicant's air cylinder is considerably smaller than a comparable vacuum cylinder.

The preferred embodiments of the present invention only require 20 PSI air pressure from the towing vehicle.

Referring to FIGS. 2 and 2A, the cylinder 110 comprises an air input port 200, an outer cylindrical wall 210, an inner cylindrical wall 250, a mounting assembly 260, mounting plate 240, mounting bolts 230 and mounting nuts 235.

The mounting assembly 260 is affixed to the towed vehicles brake pedal arm 420.

Referring to FIGS. 3 and 3A, the cylinder 110 comprises a bushing 300, a flexible cable 302, at least one return spring 315, a DELRIN washer 316 if more than one return spring 315 is used, the outer wall 210, the inner wall 250, a pull rod 340, the air input port 200, and a retaining ring 360, retaining the pull rod 340 to the outer wall 210. The cable 302 is attached to the pull rod 340 through the bushing 300 which is bronze in the preferred embodiment, and the retaining ring 360 retains the pull rod 340 to the outer wall 210. The cable is attached to a fixed point 308, such as on a firewall 309. This can be done with a firewall attachment bracket 306.

As air pressure is applied to the air input port 200, the outer wall 210 is forced to extend away from the firewall 309. The pull rod 340 is attached to the outer wall 210, so as the outer wall 210 is extended against the at least one return spring 315, thereby tightening the cable 302 against the fixed point 308. Since the inner wall 250 is affixed to the brake pedal arm 420 of the towed vehicle, the towed vehicle's brakes are applied. In the preferred embodiment, the cable 302 is a coated flexible cable known to the trade.

Figure 4A:
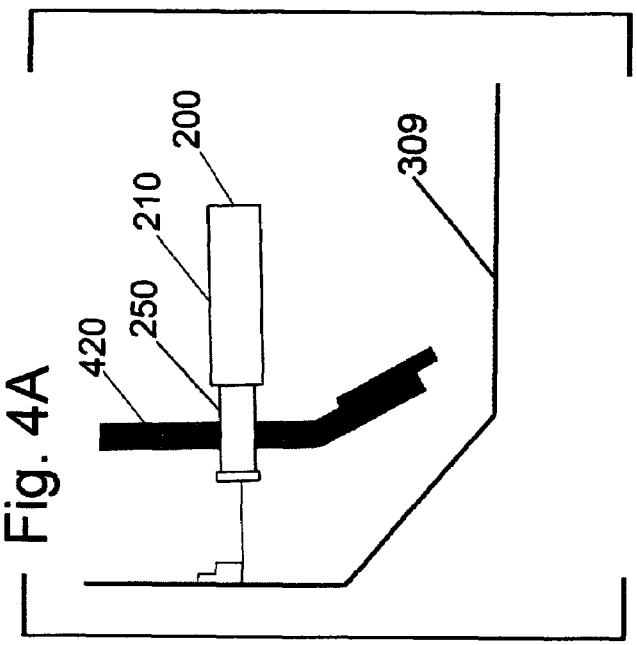
FIGS. 4 and 4A illustrate cylinder function.
Figure 4:
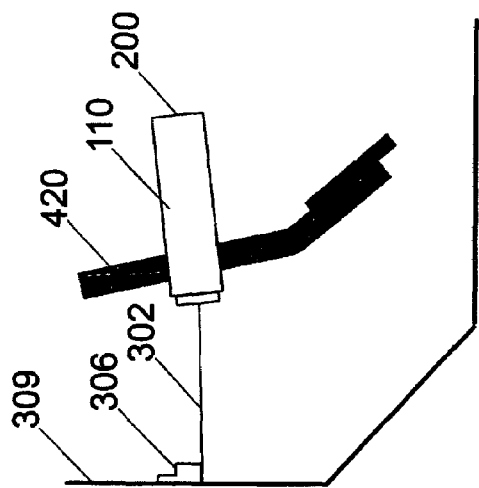

Referring to FIGS. 2 and 4, the air cylinder 110 is mounted to the brake pedal arm 420 of the towed vehicle using the mounting plate 260 and mounting bolts 230 and mounting nuts 225. As input air is applied to the air input port 200, the cable 302 is tightened against the mounting point 308. The inner wall 250 is secured to brake pedal arm 420, as air is applied to the air cylinder 110, the outer wall 210 is extended away from the firewall 309 thereby applying the towed vehicle's brakes as indicated in FIG. 4A.

In operation, positive air pressure and flow is provided from a towing vehicle brake system to inlet line 100. Air pressure in proportion to brake pressure in the towing vehicle is provided to cylinder 110 to apply the brakes in the towed vehicle in proportion to the braking in said towing vehicle. Air flow and pressure from line 100 also flows to the valve 104. The air valve 104 is a solenoid operated valve, spring biased to normally closed as shown in FIG. 1, in the preferred embodiment of the present invention. A signal from vacuum switch 125 can call for pressure to be supplied when the vacuum in brake booster 107 of the towed vehicle gets low. When air pressure from the towed vehicle passes through valve 104 it is supplied to venturi 102 and the positive flow of air through the venturi 102 creates a vacuum in line 105 that is supplied to booster 107 through vacuum switch 125. When the vacuum switch 125 senses that the vacuum in booster 107 is sufficient it will switch solenoid valve 104 to the closed position to shut off the flow of air and thereby the vacuum supplied by venturi 102. Referring to FIG. 2, the bracket 260 can be used to bolt the cylinder 110 to the brake pedal arm 420. Referring to FIG. 3 a bracket 306 can be attached to the towed vehicle fire wall at 308 and thereafter the cable 302 can be quickly attached to the bracket 306 so that the cylinder 110 can be quickly attached for repeated use. The cylinder normally stays in place once it is mounted, this is the advantage of the smaller cylinder and one of the advantages of this system.

Referring to FIG. 3 when air pressure is supplied to cylinder 110 air flows in through port 200 and fills inner wall 250 as air continues to flow the pressure in inner wall 250 will drive the inner wall 250 axially out from the outer wall 210 against the return spring 315 extending the overall length of the cylinder from the position shown in FIG. 4 to that shown in 4A. The movement of the outer wall 210 relative to the inner wall 250 actuates the brake pedal 420. The cable 302 maintains the outer wall 210 in a fixed location relative to the firewall of the towed vehicle so as the cylinder 110 expands in length the inner wall 250 moves toward the firewall 309 of the towed vehicle and takes the bracket 260 and brake pedal 420 with it. Because the venturi operates the power brakes of the towed vehicle, the cylinder 110 can be much smaller in diameter than would otherwise be possible. This is important as it takes up less space under the dash board of the towed vehicle.

This is a simpler, effective way to actuate a brake pedal than prior art. The towed vehicle brakes are applied in proportion to input air. The input air is typically, but not limited to, the air used in a towing vehicle's brake system as in the case with a diesel powered towing vehicle with air brakes. As no air cylinders were available to serve the function of the present invention, and no systems marketed today incorporate a venturi to create vacuum, applicant came up with the present invention. A venturi eliminates the need for a source of vacuum, usually a battery powered vacuum pump, typically used in towed vehicle brake actuating systems. Another big advantage of a venturi is that there are no moving parts to wear out. The venturi 102 can generate vacuum at a low supply air pressure, less than 20 PSI.

Although the description above contains many specificities, these should not be construed as limiting the scope of the invention but as merely providing illustrations of some of the presently preferred embodiments of this invention. It will be understood that the towed vehicle could be a car, truck or trailer for example.

It will be obvious to those skilled in the art that modifications may be made to the embodiments described above without departing from the scope of the present invention.

Thus the scope of the invention should be determined by the appended claims in the formal application and their legal equivalents, rather than by the examples given.

The invention claimed is:

1. A system for actuating brakes in a towed vehicle in response to actuation of brakes in a towing vehicle comprising; a cylinder including an inner cylindrical wall attached to a brake pedal in said towed vehicle and an outer cylindrical wall attached to a fixed point in said towed vehicle; an air line supplying positive airflow from said towing vehicle to said cylinder and to a venturi to create a vacuum in response to said positive airflow; said vacuum is supplied to a brake booster in said towed vehicle while said positive airflow is supplied to said cylinder to move said brake pedal in said towed vehicle in proportion to the amount of braking in said towing vehicle.

2. The system of claim 1 including a mounting to attach said inner cylindrical wall to said brake pedal and a flexible cable to attach said outer cylindrical wall to a firewall of said towed vehicle.

3. The system of claim 1 including a vacuum switch to sense vacuum pressure in said brake booster and said vacuum switch controlling the flow of positive air to said venturi to control the vacuum in said brake booster.

4. The system of claim 2 wherein said cable is releasably attached to a bracket permanently attached to the firewall of said towed vehicle.

5. The system of claim 1 wherein said inner cylindrical wall is axially aligned and contained within the outer cylindrical wall and wherein a spring surrounding said inner cylindrical wall biases said inner cylindrical wall to be contained within said outer cylindrical wall such that said positive airflow supplied to said cylinder increases an overall length of the cylinder and said spring acts to reduce said overall length.

6. The system of claim 1 wherein the venturi is located in said towed vehicle.

7. An assembly for proportionally actuating brakes in a towed vehicle in response to actuation of brakes in a towing vehicle comprising; an air actuator including a first portion attached to a brake pedal in said towed vehicle and a second portion attached to a fixed point in said towed vehicle; an air line supplying positive airflow from said towing vehicle to said actuator and to a venturi to create a vacuum in response to said positive airflow; said vacuum is supplied to a brake booster in said towed vehicle while said positive airflow is supplied to said air actuator to move said brake pedal in said towed vehicle in proportion to the amount of braking in said towing vehicle.

8. The assembly of claim 7 wherein said first portion is an inner cylinder and said second portion is an outer cylinder and a mounting to attach said inner cylinder and a flexible cable to attach said outer cylinder to a firewall of said towed vehicle.

9. The assembly of claim 7 including a sensor to sense vacuum pressure in said brake booster and said sensor controlling the flow of positive air to said venturi to control the vacuum in said brake booster.

10. The assembly of claim 8 wherein said first cylinder is coaxial with and slides inside said second cylinder.

11. A system for proportionally actuating brakes in a towed vehicle in response to actuation of brakes in a towing vehicle comprising; an actuator attached to a brake pedal in said towed vehicle; an air line supplying positive airflow from said towing vehicle to said actuator and to a venturi to create a vacuum in response to said positive airflow; said vacuum is supplied to a brake booster of a power brake system in said towed vehicle while said positive airflow is supplied to said actuator to move said brake pedal in said towed vehicle in proportion to the amount of braking in said towing vehicle.

12. The system of claim 11 where said actuator includes an inner cylinder and an outer cylinder surrounding said inner cylinder and co-axial therewith.

13. The system of claim 12 including a mounting to bolt said inner cylinder to said brake pedal and a flexible cable to attach said outer cylinder to a firewall of said towed vehicle.

14. The system of claim 11 including a vacuum switch to sense vacuum pressure in said brake booster and said vacuum switch controlling the flow of positive air to said venturi to control the vacuum in said brake booster.

15. The system of claim 13 wherein said inner cylinder is axially aligned and contained within the outer cylinder and wherein a spring surrounding said inner cylinder biases said inner cylinder to be contained within said outer cylinder such that said positive airflow supplied to said actuator increases an overall length of the actuator and said spring acts to reduce said overall length.

16. The system of claim 14 wherein said vacuum switch controls a valve to allow positive airflow to said venturi to create said vacuum.

* * * * *